United States Patent [19]

Holzenberger

[11] 4,154,484

[45] May 15, 1979

[54] APPARATUS FOR TRANSPORTING FRAGMENTS OF ORE OR THE LIKE FROM A LOWER TO A HIGHER LEVEL IN A LIQUID CARRIER MEDIUM

[75] Inventor: Kurt Holzenberger, Frankenthal, Fed. Rep. of Germany

[73] Assignee: Klein, Schanzlin & Becker Aktiengesellschaft, Frankenthal, Fed. Rep. of Germany

[21] Appl. No.: 803,218

[22] Filed: Jun. 3, 1977

[30] Foreign Application Priority Data

Jun. 5, 1976 [DE] Fed. Rep. of Germany ........ 2625513

[51] Int. Cl.² .................................................. B65G 53/30
[52] U.S. Cl. ..................................................... 406/106
[58] Field of Search ..................... 302/14, 15, 16, 66; 37/58, DIG. 8; 299/18

[56] References Cited

U.S. PATENT DOCUMENTS

| 2,672,370 | 3/1954 | Jones et al. ............................. 302/14 |
| 3,753,303 | 8/1973 | Holzenberger et al. .......... 302/14 X |
| 3,982,789 | 9/1976 | Funk ....................................... 302/14 |

*Primary Examiner*—Robert B. Reeves
*Assistant Examiner*—James L. Rowland
*Attorney, Agent, or Firm*—Peter K. Kontler

[57] ABSTRACT

Apparatus for transporting solid particles from an underground excavation to a level above the ground has a liquid-containing underground vessel which receives solid particles from a conveyor or from lorries and whose lower portion communicates with the receiving ends of two U-shaped pipes having discharge ends connected to a riser. One receiving end is connected with a high-pressure pump for clear liquid when the other receiving end receives a mixture of solid particles and liquid from the vessel, and vice versa. Simultaneously, the discharge end of the pipe which receives clear liquid communicates with the riser to admit the (previously received) mixture of solid particles and liquid while the other discharge end communicates with the intake of a suction pump which delivers clear liquid to the vessel. The valves which control the admission of mixture or pressurized liquid into the pipes and the valves which control the admission of mixture into the riser and the flow of clear liquid from the pipes are rinsed with water or are automatically held out of contact with solid particles to reduce wear upon their parts. The pumps convey clear liquid so that the wear upon their parts is also negligible. A booster, whose operation is analogous to that of the transporting apparatus, is installed in the riser so that the latter can convey the mixture through a great distance, e.g., onto a conveyor located at or above the ground and serving to intercept particles.

22 Claims, 2 Drawing Figures

APPARATUS FOR TRANSPORTING FRAGMENTS OF ORE OR THE LIKE FROM A LOWER TO A HIGHER LEVEL IN A LIQUID CARRIER MEDIUM

CROSS-REFERENCE TO RELATED INVENTION

The apparatus of the present invention constitutes an improvement over and a further development of apparatus disclosed in commonly owned U.S. Pat. No. 3,753,303 granted Aug. 21, 1973 to Holzenberger et al. for "Apparatus for hydraulically raising ore and other materials".

BACKGROUND OF THE INVENTION

The present invention relates to apparatus for transporting particulate material, such as fragments of ore or coal, in a liquid carrier medium from a lower level to a higher level. More particularly, the invention relates to improvements in apparatus of the type wherein a riser alternately receives a mixture of solid particles and liquid carrier medium from several pipes.

The German publication "Energietechnik" (Vol. 12, December 1970, pages 574 to 576, article by Laszlo Kocsanyi entitled "Hydraulische Förderung mit Rohrkammeraufgeber") describes an apparatus wherein the lower end of a riser alternatively receives a mixture of solid particles and liquid carrier medium from two discrete pipes. The apparatus employs a low-pressure pump which forces the mixture alternately into two parallel looped pipes. The receiving and discharge ends of the pipes contain valves which are actuated to seal the low-pressure pump from the receiving end of one of the pipes and to seal the discharge end of the one pipe from the riser while the pump feeds the mixture into the receiving end of the other pipe (whose discharge end is then free to communicate with the riser), and vice versa. A second (high-pressure) pump is provided to admit clear liquid into the one pipe when the other pipe receives the mixture from the low-pressure pump, and vice versa. Additional valves are provided to seal the outlet of the second pump from the one pipe while the outlet of the second pump is connected with the other pipe, and vice versa. The flow of mixture into the pipes is countercurrent to the flow of mixture from the pipes into the riser.

A serious drawback of the just described apparatus is that the low-pressure pump conveys a mixture of solid particles and liquid carrier medium. Consequently, the parts of this pump are subjected to extensive wear. The same applies for the wear upon the valves which regulate the flow of mixture from the low-pressure pump into the pipes and from the pipes into the riser. Therefore, the maintenance cost of the just described apparatus is extremely high, especially if the apparatus is designed to transport coal or ore from an underground excavation to a level above the ground. Furthermore, each repair work (even minor repairs) necessitates lengthy interruptions of operation with attendant huge losses in output and deactivation of further processing apparatus.

Another serious drawback of the just described apparatus is that the direction of flow of the mixture into the pipes is counter to the direction of flow of the mixture from the pipes into the riser. This often results in clogging of the pipes because expulsion of the mixture from the pipes is preceded by an interval of stagnation during which the particles become separated from the liquid carrier medium by gravity and agglomerate in certain portions of the pipes, particularly in the bights of their loops.

Additional drawbacks of the just described conventional apparatus include extremely high initial cost, particularly in view of the need for utilization of a large number of valves and also because the apparatus must be equipped with a plurality of pressure equalizing devices.

OBJECTS AND SUMMARY OF THE INVENTION

An object of the invention is to provide an apparatus which can be used for hydraulic transport of solid particles from a lower level to a higher level and is simpler, more rugged, less prone to malfunction and less expensive than heretofore known apparatus.

Another object of the invention is to provide an apparatus of the just outlined character wherein the pipes and conduits are not likely to be clogged, which can transport a mixture of solid particles and liquid carrier medium through any practical distance from a lower level to a higher level, and wherein the moving parts are not subjected to extensive wear as a result of abrasive action of conveyed solid particles.

A further object of the invention is to provide an apparatus for hydraulic transport of fragments of coal, ore or the like wherein the means for maintaining the liquid carrier medium in motion are effectively shielded from contact with solid particles and wherein the valves which regulate the flow of the mixture to the riser are also out of contact with solid particles.

An additional object of the invention is to provide an apparatus which can utilize underground water in a mine or another underground excavation as a liquid carrier medium for fragments of coal, ore or the like.

Another object of the invention is to provide a novel and improved riser for use in a transporting apparatus of the above outlined character.

An ancillary object of the invention is to provide an improved booster for use in the riser.

The invention is embodied in an apparatus for transporting solid particles, especially fragments of coal or ore, from a lower level to a higher level. The apparatus comprises a liquid-containing vessel which is disposed at the lower level, a conveyor or analogous means for feeding solid particles into the vessel, a riser having an upper end at the higher level and a lower end, first and second pipes having receiving ends connected with and arranged to receive a mixture of liquid and solid particles from the lower portion of the vessel and discharge ends connected with the lower end of the riser, a source of clear liquid, first pump means which is operative to convey pressurized liquid from the source to one of the receiving ends at a time, second pump means which is operative to draw clear liquid from one discharge end at a time, and control means including a plurality of valve means provided at the receiving and discharge ends to permit the mixture to flow into the receiving end of the first pipe simultaneously with withdrawal of clear liquid from the discharge end of the first pipe while the receiving end of the second pipe receives clear liquid and the discharge end of the second pipe admits the mixture into the riser, and vice versa.

The first and second pipes preferably constitute two discrete parallel branches of a twin pipe. The vessel is preferably open at a level about the body of liquid therein so that the pressure of liquid in the vessel equals or approximates the pressure of the surrounding atmosphere. The outlet of the second pump means discharges clear liquid into the vessel, and such liquid is thereupon mixed with solid particles.

The valve means preferably include first valve means (e.g., two discrete flaps) disposed at the receiving ends of the first and second pipes and movable between first and second positions in which the first valve means respectively establishes communication between the vessel and one of the receiving ends while sealing the vessel from the other receiving end and vice versa, second valve means (e.g., two butterfly valves) movable between first and second positions in which the second valve means respectively admits pressurized liquid from the first pump means into one of the receiving ends while sealing the first pump means from the other receiving end and vice versa, third valve means (e.g., two butterfly valves) movable between first and second positions in which the third valve means respectively establishes communication between one of the discharge ends and the second pump means while sealing the second pump means from the other discharge end and vice versa, and fourth valve means movable between first and second positions in which the fourth valve means respectively establishes communication between one of the discharge ends and the lower end of the riser while sealing the riser from the other discharge end and vice versa. The first and fourth valve means are surrounded by clear liquid (i.e., liquid free of solid particles) during movement between the respective first and second positions.

The fourth valve means is preferably arranged to move to one of its positions in response to movement of the third valve means to the first position, and to the other of its positions in response to movement of the third valve means to the second position. Analogously, the first valve means is preferably arranged to move to one of its positions in response to movement of the second valve means to the first position, and to the other of its positions in response to movement of the second valve means to the second position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
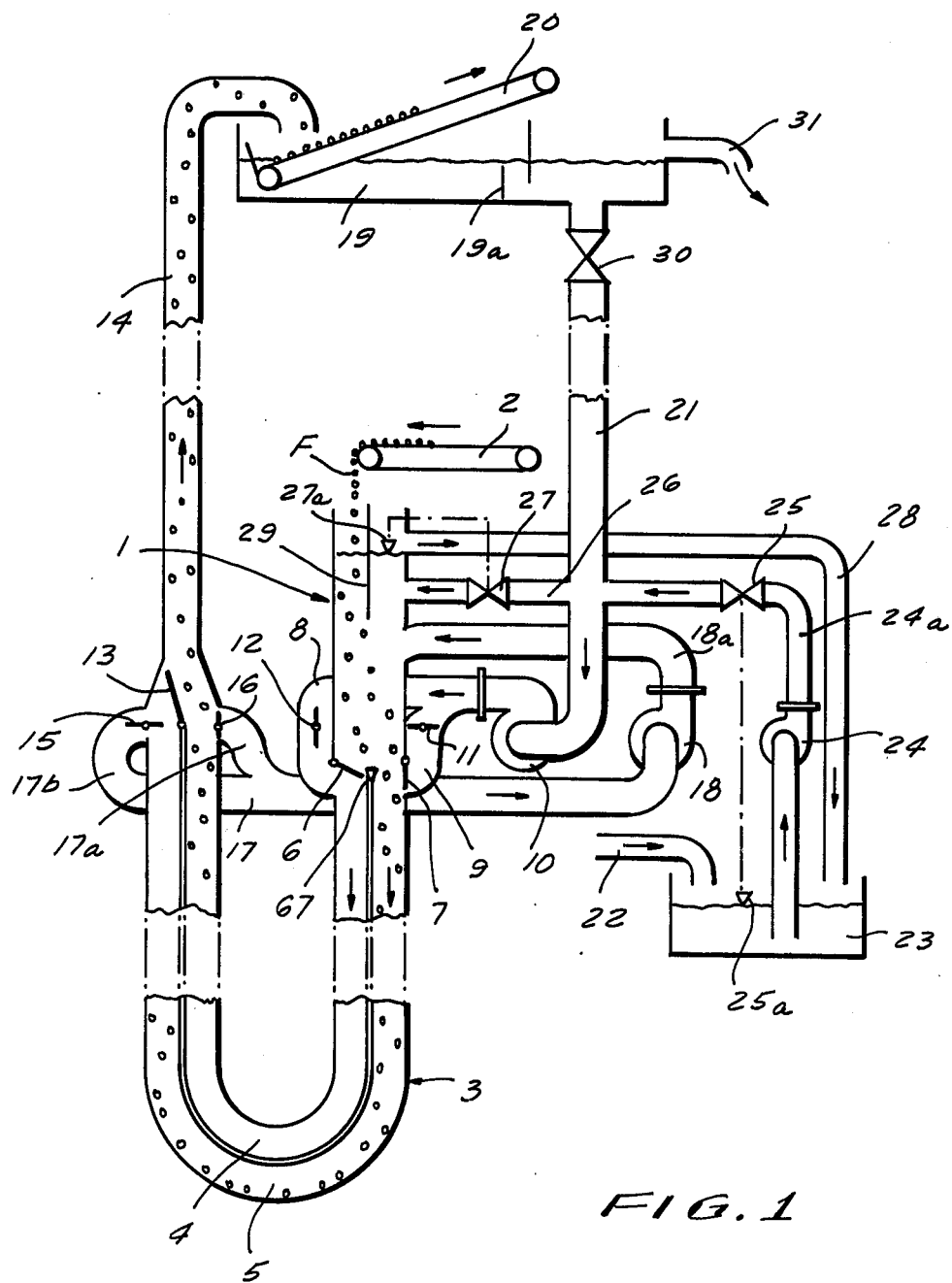
FIG. 1 is a schematic partly elevational and partly vertical sectional view of an apparatus which embodies the invention and is constructed and assembled to transport particles of ore, coal or the like from an underground excavation to a level above the ground.

The apparatus of FIG. 1 comprises an underground mixing vessel 1 which is an upright duct with an open upper end for reception of solid particles F (such as fragments of coal, ore or the like) delivered by an endless feeding belt or chain conveyor 2. The conveyor 2 can deliver fragmentized material which is removed from the mine face in an underground excavation. It is clear that the conveyor 2 can be replaced with other types of feeding means, e.g., with lorries which dump comminuted coal or ore into the vessel 1. The particles F are fed into the left-hand portion of the vessel 1 at one side of a vertical partition 29 and descend in a body of liquid (water) L toward and into the lower portion of the vessel. The pressure of liquid in the vessel 1 equals the pressure of the surrounding atmosphere. The lower portion of the vessel 1 communicates alternately with the receiving ends of two closely adjacent branches (first and second pipes) 4 and 5 of a twin pipe 3. An automatically operated pivotable flap valve 6 can seal or open the receiving end of the branch 4 when a similar flap valve 7 respectively establishes or terminates communication between the receiving end of the branch 5 and the vessel 1. The first valve means including the valves 6 and 7 can be replaced with a single valve which is pivotally mounted at the locus 67 and can turn clockwise to seal the receiving end of the second pipe or branch 5 or anticlockwise to seal the receiving end of the first pipe or branch 4. The branches 4 and 5 are U-shaped and their discharge ends merge into a common tubular riser 14 which delivers the particles F in a liquid carrier medium from a lower level (of the vessel 1) to a higher level, namely onto the upper reach of a classifying or segregating conveyor 20 which intercepts at least the majority of solid particles and allows the liquid carrier medium to descend into a settling tank 19 mounted at the ground level or above the ground.

The outlet of a first (flushing) pump 10 is connected to two pressure lines 8 and 9. The pressure line 8 communicates with the receiving end of the branch 4 when the latter is sealed from the lower portion of the vessel 1 by the valve 6, and vice versa. Analogously, the pressure line 9 admits clear water (i.e., water which is at least substantially free of solid particles) into the receiving end of the branch 5 when the latter is sealed from the lower portion of the vessel 1 by the associated valve 7. In FIG. 1, the valve 7 seals the lower portion of the vessel 1 from the line 9 and the valve 6 allows pressurized water to flow from the line 8 into the receiving end of the branch 4. Thus, the branch 4 receives water which is free of fragmentized solid material and the branch 5 receives a mixture of particles F and water. A butterfly valve 12 in the pressure line 8 is open when the valve 6 seals the branch 4 from the vessel 1, and vice versa. Analogously, a butterfly valve 11 in the pressure line 9 is closed when the valve 7 permits a mixture of particles F and water to flow into the branch 5, and vice versa. When the valve 12 is moved to the open position, the stream of water flowing from the outlet of the pump 10 toward the receiving end of the branch 4 automatically moves the valve 6 to the illustrated position; when the valve 12 is thereupon closed, the mixture of particles F and water acts upon the upper side of the valve 6 and moves the latter to the other end position in which the mixture is free to enter the branch 4. The closing and opening of butterfly valve 11 in the pipe 9 controls the movements of valve 7 in an analogous manner. The valves 11 and 12 constitute a second valve means of the control system in the improved apparatus.

A two-position (fourth) valve or gate 13 at the discharge ends of the branches 4 and 5 seals the discharge end of the branch 5 from the riser 14 when the riser communicates with the discharge end of the branch 4, and vice versa. In other words, only one branch of the twin pipe 3 can communicate wih the riser 14 at any given time. A suction line 17 has two inlet portions 17a and 17b which can respectively communicate with the discharge ends of the branches 4 and 5. The discharge end of the suction line 17 is connected with the intake of a suction pump (second pump) 18 which delivers clear liquid carrier medium into the vessel 1 via pipe 18a. The pipe 18a discharges liquid into the right-hand portion of the vessel 1, i.e., at that side of the partition 29 which faces away from the shower of descending particles F. The inlet portion 17a contains a pivotable butterfly valve 16 which is closed when the valve 13 permits the mixture of liquid and solid particles F to flow from the branch 4 into the riser 14. A similar valve 15 is installed in the inlet portion 17b to establish communication with the discharge end of the branch 5 when the valve 13 assumes the illustrated position, and to seal the inlet portion 17b from the branch 5 when the latter is free to communicate with the lower end of the riser 14. The valves 15 and 16 constitute the third valve means of the control system.

A return pipe 21 connects the bottom portion of the right-hand compartment of the settling tank 19 with the intake of the flushing pump 10. A partition 19a in the tank 19 permits clear liquid to overflow into the right-hand compartment and to enter the upper end of the return pipe 21. A liquid collecting receptacle 23 is mounted below the ground and is in communication with the discharge end of a pipe 22 which serves to collect underground water that accumulates in the excavation. An auxiliary pump 24 draws liquid from the recepacle 23 and admits such liquid into the return pipe 21, i.e., into the intake of the flushing pump 10. A valve 25 in the pipe 24a connecting the auxiliary pump 24 with the return pipe 21 is controlled by a float 25a or another suitable device which monitors the level of liquid in the receptacle 23 so that the pump 24 is free to deliver liquid into the return pipe 21 as soon as the upper surface of the body of liquid in the receptacle 23 rises to a preselected level. The parts 19, 21, 22, 23, 24, 24a constitute a source of clear liquid which is supplied to the intake of the flushing pump 10.

The return pipe 21 has a branch 26 which can admit liquid into the vessel 1 when a valve 27 in the branch 26 is open. The valve 27 opens when a float 27a or another suitable level monitoring device transmits a signal indicating that the upper surface of the body of liquid in the vessel 1 has descended to a predetermined lowermost level. Thus, the return pipe 21 and/or the auxiliary pump 24 can serve to replenish the supply of liquid in the vessel 1 in dependency on the signals furnished by float 27a.

An opening of the vessel 1 communicates with an overflow pipe 28 which conveys surplus liquid into the receptacle 23. An advantage of the receptacle 23 and auxiliary suction pump 24 is that they can collect and utilize at least some underground water which accumulates in the excavation and, in the absence of parts 23 and 24, would have to be evacuated by a discrete liquid collecting and removing system. In fact, the quantity of underground water might suffice to furnish all of the necessary liquid carrier medium; the return pipe 21 is then omitted and clear water which overflows the partition 19a is then evacuated solely by way of an overflow pipe 31 for surplus liquid. The partition 29 prevents solid particles F from accidentally entering the branch 26 and/or the pipe 28. An optional safety valve 30 is installed in the return pipe 21; this valve will be closed as soon as the quantity of underground water flowing into the receptacle 23 via pipe 22 suffices to supply the entire body of liquid carrier medium for transport of particles F from the level of the vessel 1 to that above the classifying conveyor 20. As a rule, the pipe 31 will receive a stream of clear liquid only when the quantity of underground water which enters the receptacle 23 by way of the pipe 22 exceeds the requirements of the apparatus.

The operation is as follows:

The conveyor 2 feeds a continuous or intermittent shower of solid particles F which descend into the body of liquid L in the vessel 1. The motor or motors for the pumps 10 and 18 are on, and the pump 10 discharges a continuous stream of pressurized clear or practically clear liquid into the line 8 wherein the butterfly valve 12 is open so that the stream of pressurized liquid maintains the valve 6 in the illustrated position and flows into the receiving end of the branch 4. At the same time, the pump 18 draws clear liquid from the discharge end of the branch 5 via inlet portion 17b (the butterfly valve 15 is open) and suction line 17, and the outlet of the pump 18 delivers such liquid into the vessel 1 via pipe 18a. The valve 7 allows the mixture of solid particles F and liquid L to flow into the receiving end of the branch 5 at the rate at which the pump 18 draws clear liquid from the discharge end of the branch 5. The valves 7 and 11 seal the branch 5 from the pressure line 9. The flow of solid particles F in the liquid carrier medium into the branch 5 is promoted by the pump 18, i.e., by suction at the discharge end of the branch 5. The particles F are mixed with liquid in the vessel 1 as well as during travel in the branch 5. Suction which is generated by the pump 18 can be regulated in dependency on the level of the upper surface of liquid body L in the vessel 1. For example, the float 27a can be used as a means for furnishing signals to the motor for the pump 18.

The butterfly valve 15 is closed and the valve 13 moves to the other end position before the leader of the mixture of solid particles F and liquid carrier medium in the branch 5 reaches the lower end of the riser 14. The valve 12 is also closed (while it is surrounded by liquid which is free of solid particles, the same as the valve 15). Closing of the valves 12 and 15 takes place simultaneously with opening of the valves 11 and 16 (again, such opening of the valves 11 and 16 takes place while the valves are surrounded by clear liquid to thus insure that the wear upon the valves 11 and 16 is negligible). The receiving end of the branch 5 is then connected with the pressure line 9 which admits a stream of pressurized liquid serving to move the column of solid particles F in a liquid carrier medium through the branch 5 and into the riser 14. As mentioned above, the valve 6 moves to the other end position (in which it seals the line 8 from the receiving end of the branch 4 but connects the receiving end of the branch 4 with the lowermost portion of the vessel 1) in automatic response to closing of the valve 12, the valve 7 moves to the other end position (in which it seals the vessel 1 from the receiving end of the branch 5 but connects the branch 5 with the pressure line 9) in automatic response to opening of the valve 11, and the valve 13 moves to the other end position (in which it seals the discharge end of the branch 4 from the lower end of the riser 14 but connects the lower end of the riser with the discharge end of the branch 5) in automatic response to closing of the valve 15 and simultaneous opening of the valve 16. The stream of liquid which issues from the flushing pump 10 via line 9 expels the mixture of solid particles F and liquid carrier medium from the branch 5 into the riser 14 so that the branch 5 is gradually filled with a column of clear liquid. At the same time, the branch 4 is gradually filled with a mixture of liquid carrier medium and solid particles F. The flow of such mixture into and up the riser 14 is uninterrupted, and the solid particles F which leave the riser are intercepted by the classifying conveyor 20 which transports them to a further processing station, for example, into a railroad car, a truck or another conveyance. The liquid passes through and/or overflows the sides of the conveyor 20 and accumulates in the tank 19. Any remaining solid particles settle in the lefthand compartment and the clear liquid overflows the partition 19a to enter the upper end of the return pipe 21 which conveys the liquid into the intake of the flushing pump 10. The positions of the valves 6, 7, 11, 12, 13, 15 and 16 are changed again when the column of the mixture of particles F and liquid carrier medium in one of the branches 4 and 5 reaches or approaches the lower end of the riser 14.

Due to simultaneous changes in the positions of the valves 11, 12, 15 and 16, the pressure in the twin pipe 3 varies in such a way that the positions of the valves 6 and 7 below the vessel 1 and the position of the valve 13 below the lower end of the riser 14 will change automatically in the aforedescribed manner so that the valves 6, 7 and 13 need not be actuated from the outside. The rate at which the pressure line 8 or 9 delivers presurized liquid from the outlet of the flushing pump 10 preferably exceeds the rate of liquid flow through the suction pump 18; this insures that the valve 13 moves to a different position as soon as it is surrounded by clear liquid. The same applies for the valves 6 and 7 below the vessel 1. The just described feature insures that the wear upon the valves 6, 7 and 13 is negligible and also that these valves cannot jam due to accumulation of solid particles on their seats.

It is further within the purview of the invention to arrest the conveyor 2 (i.e., to interrupt the admission of solid particles F into the body of liquid L) at certain intervals which are necessary to insure that the valves 6, 7 and 13 move to differend positions while surrounded by liquid which is free of practically free of solid particles. Since the valves 15 and 16 also change their positions before the solid particles in the respective branches 5 and 4 rise to their level, the suction line 17 is invariably free of solid particles, the same as the interior of the suction pump 18.

An advantage of the improved apparatus is that its pumps and valves are held out of contact with solid particles. Furthermore, the direction of flow of the mixture into the branches 4 and 5 is the same as the direction of flow of the mixture from the branches 4 and 5 into the lower end of the riser 14. Therefore, clogging of the branches 4 and 5 by agglomerations of solid particles which become segregated from the liquid carrier medium is highly unlikely. A further advantage of the improved apparatus is that it employs a surprisingly small number of valves, especially if the first (6, 7), second (11, 12) and/or third (15, 16) valve means comprises a single valve. The pumps 10, 18 and 24 can be driven by a common prime mover, and a common actuating means can be provided for the valves 11, 12 and 15, 16. This, too, contributes to simplicity, lower cost and greater reliability of the apparatus. The controls (knobs, pushbuttons or the like) for all pumps, their prime mover means and the valves can be installed on a single control panel within reach of the hand of an attendant. Moreover, the U-shaped configuration of the branches 4 and 5 renders it possible to install the valves 6, 7, 11, 12 close to the valves 13, 15, 16 (and preferably also close to the prime mover means for the pumps) so that all parts which are likely to require periodic inspection are close to each other. This contributes to lower maintenance cost.

Figure 2:
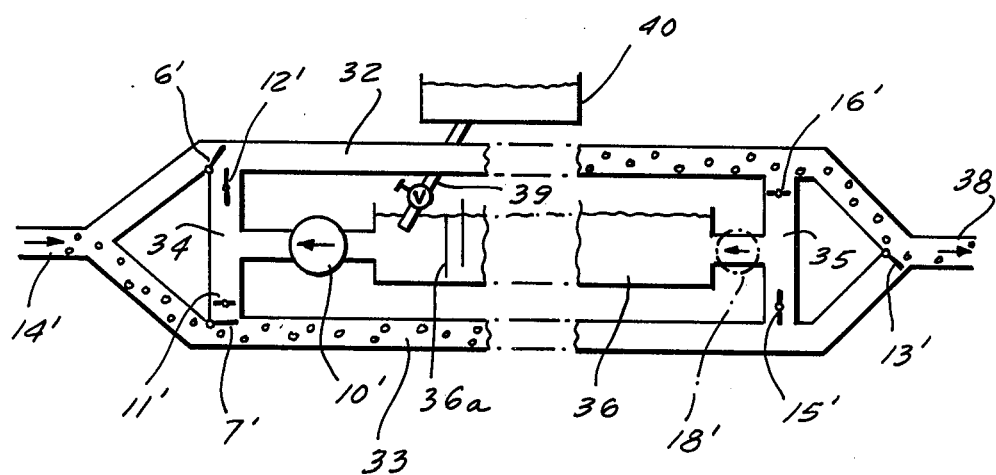
FIG. 2 is a schematic partly elevational and partly sectional view of a booster unit in the riser of the apparatus of FIG. 1.

FIG. 2 illustrates a booster unit which is installed between spaced-apart lower and upper sections 14' and 38 of the riser 14. The booster unit comprises first and second conduits or arms 32 and 33 which extend between and communicate with the discharge end of the section 14' as well as with the intake end of the section 38. The upstream portions of the arms 32 and 33 are connected to each other by a third conduit 34 and the downstream portions of these arms are connected with each other by a fourth conduit 35. The control system of the booster unit comprises additional valves 6', 7', 11', 12', 13', 15' and 16'. The valve 6' is a flap which is pivotable at the junction of arm 32 and conduit 34 between the illustrated position in which the arm 32 communicates with the conduit 34 but is sealed from the section 14' and a second position in which the arm 32 is free to communicate with the section 14' but is sealed from the conduit 34. The valve 7' is also a flap which is installed at the junction of the arm 33 with conduit 34. The valves 11' and 12' are butterfly valves which are respectively adjacent to the valves 7' and 6'. When the valve 12' is open, the valve 11' is closed; this entails automatic movement of valve 6' to the illustrated (open) position in which the conduit 34 can admit pressurized liquid into the arm 32, and automatic movement of the valve 7' to the illustrated (closed) position in which the arm 33 can receive a mixture of solid particles and liquid carrier medium from the section 14'.

The valves 15' and 16' are butterfly valves and are installed in the end portions of the conduit 35. The valve 15' is open when the valve 16' is closed, and vice versa. The valve 16' is closed when the column of presurized liquid flowing from the conduit 34 expels a mixture of solid particles and liquid carrier medium from the arm 32; at the same time, the valve 15' is open to admit clear liquid from the arm 33 into the conduit 35. The valve 13' is an automatically pivotable flap which is installed at the junction of the arms 32 and 33 with the section 38 to seal the arm 33 from the section 38 when the pressure of liquid in the arm 32 is higher than in the arm 33, and vice versa.

The conduits 34, 35 communicate with the opposite ends of a settling tank 36 having a partition 36a. Clear liquid flows from the conduit 35 into the right-hand compartment of the tank 36 wherein the remaining solid particles (if any) settle and clear liquid overflows into the left-hand compartment which is connected to the conduit 34 by an additional liquid pressurizing pump 10'. If the pressure in the section 14' is too low, the booster unit of FIG. 2 may comprise a suction pump 18' (indicated by broken lines) between the conduit 35 and the right-hand compartment of the tank 36. The upper side of the settling tank 36 is open.

The mode of operation of the booster unit of FIG. 2 is analogous to that of the apparatus of FIG. 1. The main difference is that the tank 36 of FIG. 2 performs the functions of the vessel 1 and tank 19 of FIG. 1. It is assumed that the section 14' corresponds to the riser 14 of FIG. 1. The pump 10 of FIG. 1 causes a mixture of solid particles F and liquid carrier medium to flow into the arm 32 or 33, depending on the positions of the valves 6' and 7'. In FIG. 2, the valves 6' and 7' prevent the mixture from flowing into the arm 32 but allow the mixture to enter into and flow in the arm 33. Shortly before the leader of the mixture reaches the valve 15', the valves 11', 12', 15' and 16' are caused to simultaneously assume their other positions to insure that solid particles cannot pass from the arm 33 into the conduit 35. The pump 10' furnishes a stream of pressurized liquid which flows into the conduit 34 and thence into the arm 33 to expel the mixture from the arm 33 into the section 38. At the same time, the valve 6' allows the mixture to flow from the section 14' into and to gradually fill the arm 32.

The tank 36 serves to collect any such solid particles which happen to enter the conduit 35, either from the arm 32 or from the arm 33. The booster unit of FIG. 2 may constitute one of several booster units which are installed in a relatively long riser. This insures that the mixture of solid particles and liquid carrier medium enters the tank 19 at a predictable rate. The pump 10' is shielded from solid particles, the same as the pump 10 of FIG. 1, because any solid material which happens to enter the conduit 35 is intercepted and settles in the right-hand compartment of the tank 36, i.e., only clear liquid is allowed to overflow the partition 36a. Another advantage of the booster unit of FIG. 2 is that it guarantees the flow of mixture in a relatively long riser without causing pronounced changes in the speed and/or direction of flow of the mixture. Moreover, the provision of one or more booster units in the riser insures that the pump 10 of FIG. 1 need not effect a highly pronounced pressurization of liquid which is used to advance columns of a mixture of solid particles and liquid carrier medium in the branches 4, 5 and riser 14; this is desirable and advantageous because the thickness of the walls of piping in the apparatus of FIG. 1 and/or of conduits in the booster unit of FIG. 2 need not be increased for the purpose of preventing bursting in response to high internal pressures. In other words, the apparatus and the booster unit can be assembled of thin-walled pipes and conduits consisting of any one of a wide variety of materials which can stand the abrasive action of particles F and the corrosive action (if any) of the liquid carrier medium. It goes without saying that the booster unit of FIG. 2 can be used with equal advantage in risers of any kind, i.e., not only in risers which receive a mixture of solid particles and a liquid carrier medium from the apparatus of FIG. 1 or a similar apparatus.

The pumps 10 and 10' can constitute conventional clear water pumps. This reduces the initial and maintenance cost and is attributable to the fact that these pumps are held out of contact with solid particles. The efficiency of a clear water pump is much higher than that of a sludge pump, i.e., of a pump which is designed to convey liquids or pastes containing solid particles.

The booster unit of FIG. 2 would not interfere with continuous transport of the mixture through the riser even in the event of malfunction or intentional stoppage of the prime mover for the pump 10'. The additional valves of FIG. 2 would automatically assume positions in which the material entering the booster unit via section 14' would be equally divided betweem the arms 32 and 33. In other words, the additional valves would offer a minimum of resistance to the flow of mixture from the section 14' toward and into the section 38. The speed of the mixture would be lower but the mixture would continue to flow toward the tank 19.

The reference character 39 denotes in FIG. 2 a conduit which, when necessary, feeds a relatively small quantity of clear liquid (water) from a source 40 into the left-hand compartment of the settling tank 36. The quantity of liquid which is admitted via conduit 39 is a relatively small percentage of the quantity of liquid flowing through the section 14' per unit of time; the liquid which is admitted via conduit 39 insures that the speed of the liquid stream issuing from the pump 10' slightly exceeds the speed of liquid flowing from the section 14' into the arm 32 or 33; this, in turn, insures that the valve 13' automatically changes its position only when it is surrounded by a body of clear liquid.

It is further within the purview of the invention to replace the valves 11', 12' or 15', 16' with three-way mixer valves, i.e., to use two three-way mixer valves as a substitute for the valves 11', 12', 15' and 16'. The booster unit would operate automatically by regulating the pump 10' in dependency on the level of liquid in the tank 36 and by automatically changing the positions of the two mixer valves whenever the pump shaft completes a predetermined number of revolutions.

The apparatus of FIG. 1 and/or the booster unit of FIG. 2 may be provided with automatic rinsing systems for the valves 6, 7 and 6', 7' to further insure that such valves change their positions only when surrounded by a liquid which is free of solid particles. Such rinsing systems can include nozzles which receive clear liquid from the outlet of the pump 10 or 10', or from a discrete source of clear liquid.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. Apparatus for transporting solid particles, particularly fragments of coal or ore, from a lower to a higher level, comprising a liquid-containing vessel disposed at said lower level; means for feeding solid particles into said vessel; a riser having an upper end located at said higher level and a lower end; first and second pipes having receiving ends connected with and arranged to receive a mixture of liquid and solid particles from said vessel and discharge ends connected with the lower end of said riser; a source of clear liquid; first pump means operative to convey liquid from said source to one of said receiving ends at a time; a first closed hydraulic circuit for said first pump means, said circuit including one of said pipes; second pump means operative to draw clear liquid from one of said discharge ends at a time; a second closed hydraulic circuit for said second pump means, said second circuit including said vessel and the other of said pipes, the upper level of liquid in said vessel being above the level of said second pump means; and control means including a plurality of valve means provided at said receiving and discharge ends to permit said mixture to flow into the receiving end of said first pipe simultaneously with withdrawal of clear liquid from the discharge end of said first pipe while the receiving end of said second pipe receives clear liquid and the discharge end of said second pipe admits said mixture into said riser, and vice versa.

2. Apparatus as defined in claim 1, wherein said first and second pipes constitute two discrete parallel branches of a twin pipe, said vessel being open at a level above the liquid therein so that the pressure of such liquid equals the pressure of the surrounding atmosphere and said vessel having a lower portion which is connected with the receiving ends of said first and second pipes.

3. Apparatus as defined in claim 1, wherein said second pump means comprises an outlet which discharges liquid into said vessel.

4. Apparatus as defined in claim 1, wherein said valve means include first valve means disposed at said receiving ends and movable between first and second positions in which said first valve means respectively establishes communication between said vessel and one of said receiving ends while sealing said vessel from the other receiving end and vice versa, second valve means movable between first and second positions in which said second valve means respectively admits pressurized liquid from said first pump means into one of said receiving ends while sealing said first pump means from the other receiving end and vice versa, third valve means movable between first and second positions in which said third valve means respectively establishes communication between one of said discharge ends and said second pump means while sealing said second pump means from the other discharge end and vice versa, and fourth valve means movable between first and second positions in which said fourth valve means respectively establishes communication between one of said discharge ends and said riser while sealing said riser from the other discharge end and vice versa.

5. Apparatus as defined in claim 4, wherein said first and fourth valve means are surrounded by clear liquid during movement between said first and second positions thereof.

6. Apparatus as defined in claim 4, wherein said fourth valve means is arranged to move to one of said positions thereof in response to movement of said third valve means to the first position of said third valve means and to the other of said positions thereof in response to movement of said third valve means to the second position of said third valve means.

7. Apparatus as defined in claim 4, wherein said first valve means is arranged to move to one of said positions thereof in response to movement of said second valve means to the first position of said second valve means and to the other position thereof in response to movement of said second valve means to the second position of said second valve means.

8. Apparatus as defined in claim 4, wherein at least one of said first, second and third valve means comprises two discrete valves one of which is open while the other is closed, and vice versa.

9. Apparatus as defined in claim 4, wherein the capacity of said first pump means exceeds the capacity of said second pump means.

10. Apparatus as defined in claim 4, further comprising means for rinsing said first valve means with a liquid which is free of solid particles.

11. Apparatus as defined in claim 1, wherein said source includes a tank arranged to receive liquid from the upper end of said riser, and a return pipe connecting said tank with said first pump means.

12. Apparatus as defined in claim 1, wherein said source includes a liquid reservoir and auxiliary pump means for conveying liquid from said reservoir to said first pump means.

13. Apparatus as defined in claim 12, further comprising an overflow pipe connecting said vessel with said reservoir.

14. Apparatus as defined in claim 12, further comprising means for collecting underground water and for delivering collected underground water to said reservoir.

15. Apparatus as defined in claim 1, further comprising at least one booster unit in said riser.

16. Apparatus as defined in claim 15, wherein said riser comprises a first section and a second section above said first section, said booster unit comprising discrete first and second conduits each connecting said first section with said second section, a third conduit connecting said first and second conduits, a fourth conduit connecting said first and second conduits downstream of said third conduit, additional pump means having a suction inlet receiving liquid from said fourth conduit and an outlet for admission of pressurized liquid into said third conduit, and second control means including a plurality of additional valve means provided between said first and second conduits on the one hand and said third and fourth conduits on the other hand as well as at the junctions of said first and second conduits with said first and second sections to permit said mixture to flow from said first section into said first conduit simultaneously with flow of said mixture from said second conduit into said second section while said third conduit admits pressurized liquid into said second conduit and said fourth conduit receives liquid from said first conduit, and vice versa.

17. Apparatus as defined in claim 16, further comprising a settling tank interposed between said additional pump means and said fourth conduit.

18. Apparatus as defined in claim 17, further comprising fourth pump means for conveying liquid from said fourth conduit into said tank.

19. Apparatus as defined in claim 16, wherein said additional valve means includes two valves at each end of said third conduit, one of each of said two valves permitting communication between said first or second conduit and said third conduit while the other of said two valves seals said first or second conduit from said first section, and vice versa.

20. Apparatus as defined in claim 16, wherein said additional valve means includes first and second valves in said fourth conduit, said first valve being arranged to seal said fourth conduit from said first conduit while said second valve establishes communication between said second and fourth conduits, and vice versa.

21. Apparatus for transporting solid particles, particularly fragments of coal or ore, from a lower to a higher level, comprising a liquid-containing vessel disposed at said lower level; means for feeding said solid particles into said vessel; a riser having an upper end located at said higher level and a lower end, said riser including a first section and a second section above said first section; first and second pipes having receiving ends connected with and arranged to receive a mixture of liquid and solid particles from said vessel and discharge ends connected with the lower end of said riser; a source of clear liquid; first pump means operative to convey liquid from said source to one of said receiving ends at a time; second pump means operative to draw clear liquid from one of said discharge ends at a time; control means including a plurality of valve means provided at said receiving and discharge ends to permit said mixture to flow into the receiving end of said first pipe simultaneously with withdrawal of clear liquid from the discharge end of said first pipe while the receiving end of said second pipe receives clear liquid and the discharge end of said second pipe admits said mixture into said riser, and vice versa; and at least one booster unit in said riser, said booster unit comprising discrete first and second conduits connecting said first section with said second section, a third conduit connecting said first and second conduits, a fourth conduit connecting said first and second conduits downstream of said third conduit, additional pump means having a suction inlet receiving liquid from said fourth conduit and an outlet for admission of pressurized liquid into said third conduit, second control means including a plurality of additional valve means provided between said first and second conduits on the one hand and said third and fourth conduits on the other hand as well as at the junctions of said first and second conduits with said first and second sections to permit said mixture to flow from said first section into said first conduit simultaneously with flow of said mixture from said second conduit into said second section while said third conduit admits pressurized liquid into said second conduit and said fourth conduit receives liquid from said first conduit, and vice versa, a second source of liquid and conduit means for conveying liquid from said second source into said tank so that said additional pump means admits liquid into said third conduit at a rate exceeding the rate of flow of mixture in said first section.

22. Apparatus as defined in claim 21, wherein said additional valve means at the junction of said first and second conduits with said second section is operative to automatically seal said second conduit from said second section when the pressure in said first conduit exceeds the pressure in said second conduit, and vice versa.

* * * * *